United States Patent Office 2,917,780
Patented Dec. 22, 1959

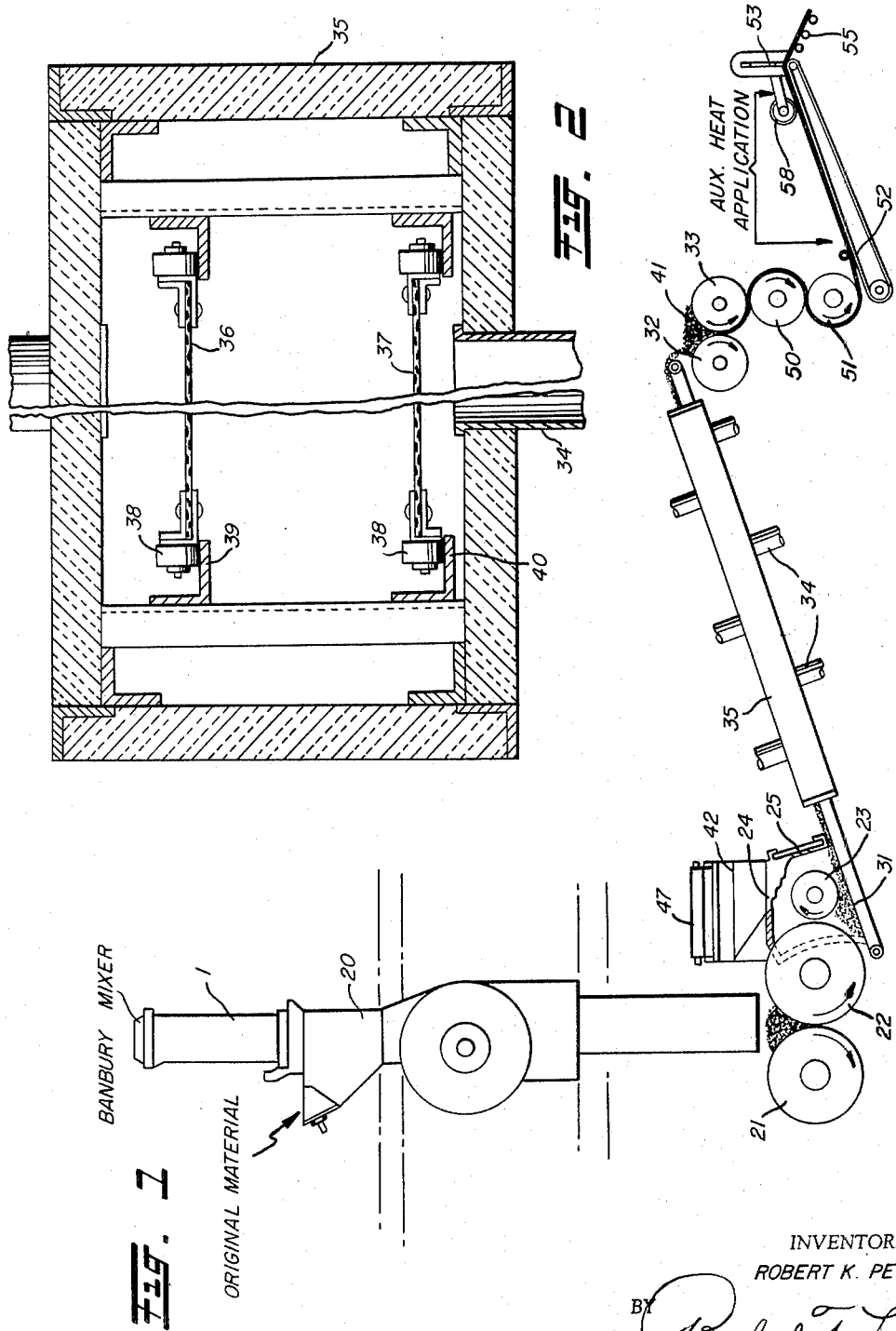

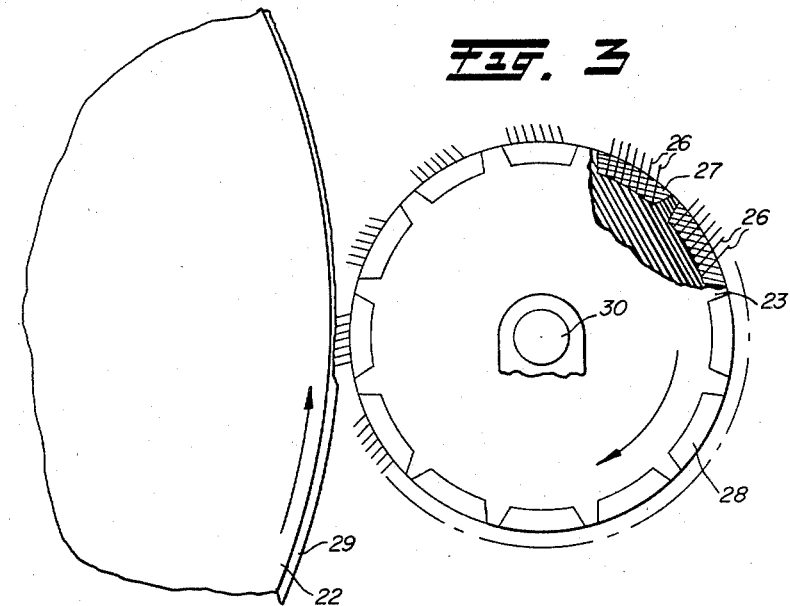
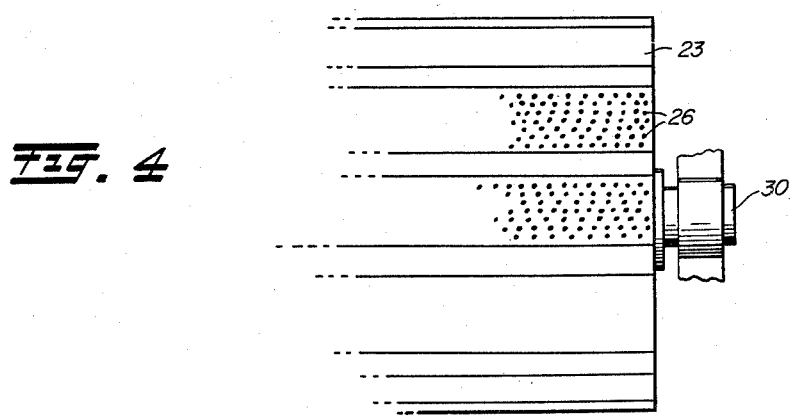
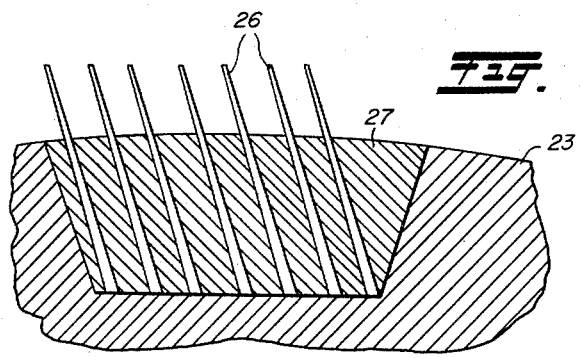

2,917,780

METHOD FOR MAKING THERMOPLASTIC PARTICLES

Robert K. Petry, Wilmington, Del., assignor to Congoleum-Nairn Inc., a corporation of New York Application August 23, 1952, Serial No. 305,994

12 Claims. (Cl. 18—48.8)

This invention relates to method and apparatus for making thermoplastic composition products. It relates especially to method and apparatus for producing such products in sheet form, and to method and apparatus for producing products and sheets which are of variegated color. This application is a continuation-in-part of my application Serial No. 43,274 filed August 9, 1948 for "Process and Apparatus for Manufacturing Thermoplastic Products" and of my application Serial No. 93,126 filed May 13, 1949 for "Manufacture of Thermoplastic Resinous Sheet Material," both now abandoned.

More specific aspects of this invention relate to method and apparatus whereby such products may be successfully produced utilizing colored vinyl plastic composition comprising thermoplastic vinyl resin and filler.

Features and objects of this invention relate to steps and combinations of steps and to controls exercised therein whereby thermoplastic compositions such as a vinyl plastic composition may be successfully produced and formed into a product such as a sheet and whereby a sheet product may be produced suitable for use in flexible smooth surface coverings having either a plain color or a variegated color such as a jaspe or marbleized effect. Other features and objects of this invention relate to steps and combinations of steps and to controls exercised therein whereby improvements in quality and uniformity are afforded, and whereby improved appearance is afforded both as regards surface finish and as regards the definition and distinctness of color contrasts in the case of products of variegated color.

Certain of the objects and features of this invention relate to the employment in combination of steps and apparatus whereby a vinyl plastic composition is produced, is converted into particulate or granular form, and is formed into a sheet which may be provided with a gloss finish and which, if variegated, may be jaspe or marbleized, and to certain controls maintained therein which are critical to obtaining an improved product. While the steps and apparatus are preferably employed in combination certain of the features of this invention relate to subcombinations of steps and apparatus elements.

In the manufacture of a product such as a smooth surface covering it has long been recognized that the employment of a thermoplastic composition which is sufficiently hard and tough at ordinary temperatures to be resistant to wear and indentation offers certain advantages due chiefly to the fact that such a composition, if it can be successfully formed into a satisfactory sheet, is ready for use immediately after cooling from an elevated temperature at which the thermoplastic composition can be worked. Such properties of a thermoplastic composition are to be contrasted with those of conventional linoleum composition which depends on the use in the binder therefor of a drying oil such as linseed oil that hardens by oxidation. During the manufacture of a linoleum type floor covering the linoleum composition is initially prepared using a drying oil which is only in a partially oxidized condition whereby the linoleum composition at normal temperatures is of a putty-like consistency permitting it to be mixed, sheeted and made adherent to a suitable base sheet. However, such a linoleum type floor covering after it initial production is not ready for use due to the soft putty-like consistency of the layer of linoleum composition. In order to harden the layer of linoleum composition it is necessary to season it and such seasoning requires prolonged exposure to air at an elevated temperature in an operation which is costly both from the point of view of the time and labor involved and from the point of view of the size and cost of the equipment which is required. However, notwithstanding such disadvantages inherent in the use of linoleum composition or the like, the bulk of the flexible smooth surface coverings that have been manufactured and sold heretofore have been of the linoleum type comprising a molded layer of linoleum composition or have been of the type wherein a suitable paint or the like is applied to a suitable base sheet as by a printing operation. This has been due principally to the difficulties that have been encountered in successfully formulating and processing a thermoplastic composition whereby a commercially satisfactory product may be obtained. Moreover, while linoleum composition lends itself to processing whereby attractive floor coverings of variegated color may be obtained such as jaspe or marbleized coverings, especially severe difficulties have been encountered in connection with attempting to produce such products using a thermoplastic composition. According to this invention such difficulties have been successfully overcome and highly satisfactory flexible smooth surface coverings have been produced both of plain color and of variegated color using a thermoplastic composition material. It is an advantage of this invention that the aforesaid objectives have been attained in a manner which is economical and practical and by which accurately reproducible results are obtainable at a high production rate.

One of the features of this invention relates to production of heat plasticized particles of thermoplastic composition by novel method steps and apparatus whereby under requisitely controlled temperature conditions a thermoplastic composition is mixed, is sheeted and is made adherent as a sheet to a rotating roll, the heat plasticized sheet being converted into particles by gouging the particles therefrom while it is carried in adherent relation on the surface of the rotating roll. Other features of this invention relate to the production of a calendered sheet by the sequential operations of sheeting a heat plasticized mass of thermoplastic composition, converting the resultant sheet to the form of heat plasticized particles, and calendering the heat plasticized particles. Other features of this invention relate to the production of heat plasticized particles of thermoplastic composition having different colors and the commingling of same to form a mixture of variegated color imparted by the particles and the subsequent calendering of the mixed particles under conditions of control that are critical to obtaining improved sheets of variegated color.

The foregoing and other objects, features and advantages of this invention are further developed hereinbelow in connection with the following more detailed description of this invention and the exemplification thereof in connection with the accompanying drawings, wherein Fig. 1 is a diagrammatic elevational view of a portion of a main chain of apparatus employed in the process;

Fig. 2 is a vertical section of a heated conveyer employed in the apparatus;

Figs. 3, 4 and 5 are views showing details of a so-called gouging or scratcher roll employed in the apparatus.

Preferred materials employed in the process

In the preparation of colored plastic products by means of the present invention, it is preferable to employ a composition which is thermoplastic and contains no material that requires drying, curing or vulcanization to condition it. Coloring materials preferably in solid, finely divided form are mixed with sufficient binder consisting preferably of a plasticized, thermoplastic, elastomeric polymer to render a sheet prepared therefrom, solid and compact, and yet flexible or pliable, resilient, and elastic. The materials are preferably such as will require no addition of volatile solvent or moistening agent to facilitate distribution of the coloring material in the plastic.

The thermoplastic, elastomeric polymers employed in the present invention are preferably vinyl polymers in the high molecular weight range. Preferred among the latter are the polymers of vinyl chloride, vinyl acetate, vinyl butyral, and copolymer of vinyl chloride and vinyl acetate. A copolymer which has proven satisfactory is one prepared from 93 to 95 percent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except preferably the addition of a plasticizer.

Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxyl ethyl phthalate, dibutoxyglycol phthalate, polyethyleneglycol di-2-ethyl hexoate, triethyleneglycol di-2-ethyl hexoate and the like.

Pigments or fillers employable are, for example, asbestine, barytes, calcium carbonate, calcium sulfate, clay, dolomite, mica, silica, slate flour, serpentine, talc. Synthetically prepared pigments, and natural pigments and others, including chrome green, chrome yellow, carbon black, titanium dioxide, are used for providing solid colored or variegated plastic products referred to herein. Dyes miscible or immiscible with the resins may, in certain instances, also be used.

Fibers, such as asbestos, cork, wood flour, cellulose fibers in general, and others, including animal fiber, such as leather, may be added.

The particle size of pigments or fillers should be such that they will preferably pass through a 325 mesh screen. Fibers, if employed, as for instance, wood flour, should pass through a 50 mesh screen, though finer grades can be used. Asbestos fibers, namely, "shorts," pass completely through a 10 mesh screen.

Traces of lubricants such as stearic acid, and metallic stearates, and of stabilizers such as basic lead carbonate, basic lead silicate, and basic lead stearate are generally added to the mix.

A mix for preparing a desirably colored plastic material contains substantially 50% to substantially 75% by weight of filler material, including color pigment alone or both pigment and fiber. These limits are varied not more than one to five percent. A ratio of pigment filler to fibrous filler that is particularly desirable for floor and wall covering, is two parts by weight of pigment to one part of weight of fiber. Preferably not more than 50% of fiber is used in the mixed filler, thoroughly and uniformly distributed.

Mixes for preparing colored sheets contain in parts by weight from about 16 to about 38 parts of the polymer, about 7 to about 18 parts of the plasticizer, and about 50 to about 75 parts of filler. Optimum proportions for wear surfaces are about 23 parts of polymer, about 12 parts of plasticizer, and about 65 parts of filler. A compounded sheet containing the various pigments and fillers in the proportions stated has a preferred specific gravity of 1.85 to 1.90. Depending on the types of fillers and to some extent the proportion thereof, the specific gravity may be as low as 1.5.

A number of complete formulae of mixes are set forth in Patent No. 2,558,378 which resulted from my application Serial No. 722,291, filed January 15, 1947. Though specific proportions of materials are stated above, such proportions are variable in the present process depending upon the effects desired and the use of the final product.

Compositions of the character aforesaid which comprise a thermoplastic vinyl resin and a filler are referred to herein and in the claims for the sake of brevity as vinyl plastic composition, and sheets, particles and the like made therefrom are similarly referred to as vinyl plastic sheets, vinyl plastic particles, etc.

The thermoplastic composition such as a vinyl plastic composition is mixed in the mixer 1 at a temperature at which it is of plastic and workable consistency. The mixed composition is passed from the mixer 1 to the sheeter by which it is formed into a sheet while of moldable heat plasticized consistency. The resulting sheet, as will be described more in detail below, is comminuted or reduced to particles or granules by reducing means exemplified by the so-called scratcher or gouging roll adapted to gouge moldable heat plasticized particles from the sheet.

The particles or granules by means of a heated conveyer are conveyed to the calender by which the heated granules are formed into a continuous sheet.

If a sheet of variegated color is desired plastic composition particles or granules of a different or contrasting color, one or more, may be separately and similarly prepared by means of the mixer, the sheeter and the scratcher roll. These particles or granules of a different or contrasting color are commingled with the other particles or granules preferably by feeding them at a regulated rate by heated conveyer means. In such case the resultant commingled particles consisting a mixture of variegated color imparted by the particles of different color are passed to the calender by the heated conveyer and the sheet formed by the calender will be of variegated color having a so-called jaspe appearance.

Detailed description and exemplification of invention

Certain of the features and advantages of this invention will now be described and exemplified in greater detail in connection with Figs. 1 to 5 inclusive and in connection with the employment of a thermoplastic composition such as a vinyl plastic composition of the character hereinabove exemplified. During processing the composition is maintained under controlled temperatures, which for certain steps is relatively high, the composition remaining moldable at the temperature prevailing during the steps, while preferably avoiding employment of temperatures so high that the composition employed when molded will not retain its shape. For obtaining uniform results accurately maintained temperature controls are important, and for obtaining desired effects control of temperature and maintenance of certain temperature differentials are also important both from the point of view of operativeness and the appearance of the product especially in the case of the production of products of variegated color. A vinyl plastic composition such as hereinabove exemplified can be conveniently mixed and sheeted while maintaining the temperature thereof uniformly above 300° F. and while certain of the features of this invention may be practiced while maintaining such elevated temperatures the temperatures occurring in various steps may range above or below 300° F. and maintenance of certain temperatures and temperature differentials is highly important in the production of certain products according to this invention as will more fully appear hereinbelow.

The ingredients of the thermoplastic composition are charged into a mixer 20, such as a Banbury mixer which is of suitable heavy construction and is provided with means for controlling the temperature of the materials being mixed therein. In the case of preferred vinyl plastic composition of the character aforesaid the temperature of the charge is in the approximate range of about 325° F. to about 375 F. although a somewhat lower mixing temperature down to about 300° F. may be employed in the case of such vinyl plastic compositions which employ a relatively soft vinyl resin or a relatively high ratio of plasticizer to vinyl resin. The materials charged into the mixer may be in their original raw condition, or may include reworked scrap, or all or a portion thereof may be preblended. A typical mixing temperature for a vinyl plastic composition having good all around properties for use as a floor covering is approximately 350° F. The mixing temperature is that temperature at which the ingredients become commingled under the influence of the mechanical mixing action to form a substantially heat plasticized workable mass which is substantially homogeneous in the sense that the ingredients are substantially homogeneously interdistributed. The mixing temperature is determined both by the steam pressures employed in heating the mixer, and by the large amount of heat which results from the internal friction developed in the material itself during the mixing operation. Well known means (not shown) are provided for accurately controlling the mixing temperature, and to make known to the operator the actual temperature of the material during mixing and at the time discharge. The temperature of the discharged stock is preferably maintained substantially constant. The mixing temperature desired is attained immediately prior to discharge of the mass and when the conditions have been attained at which the resin has all become fused and homogeneously blended with the other ingredients. This usually requires a mixing period of about 4 to 10 minutes depending on such factors as the rate at which the mixer is operated, the amount of heat supplied thereto and the size of the batch. The mixing temperature attained should be sufficiently high to obtain such fusion and homogeneous blending but excessive temperature development may result in degradation of the vinyl resin. In order to avoid over-heating of the charge, it should be discharged from the mixer when the desired mixing temperature is attained.

The next step in the operation is to convert the hot plastic mass produced in the mixer into discrete heat plasticized particles or granules of moldable consistency, and certain of the features of this invention relate to the method and apparatus whereby this result has been successfully accomplished. This conversion of the hot plastic mass to heat plasticized particles or granules involves the carrying of a hot sheet formed from the hot plastic mass in firmly adherent relation to the surface of a rotating roll and the gouging of the particles or granules from the hot sheet while so carried by the rotating roll. These operations will now be illustratively described in greater detail.

The hot plastic mass after having been mixed in the Banbury mixer 1 is discharged therefrom onto a two roll mill or sheeter which comprises the rolls 21 and 22, and the operation is carried out so that a supply of hot plastic mass is maintained for continuously feeding the sheeter. The rolls of the sheeter preferably are in a horizontal position as shown so as to facilitate the feeding of the hot plastic mass therebetween, and can be adjustably spaced to provide any desired thickness of sheet. These rolls are driven by a variable speed motor (not shown) and are geared so that the roll 22 revolves preferably at a greater peripheral speed than that of the roll 21. Moreover the roll 22 is preferably maintained at a substantially higher temperature than that of the roll 21, the rolls 21 and 22 being heated as with steam so that their respective temperatures may be controlled and so that plastic sheet temperature can be likewise controlled and regulated. When the mixing temperature is in the above mentioned range the temperature of the mixing rolls, and especially that of the mixing roll 22 on which the sheet is carried after its formation, should be in the same range. For example, temperatures for the mixing rolls in the approximate range of 325° F. to 350° F. are suitable, although a somewhat lower temperature for the roll 21 of approximately 300° F. may be employed. The heat of the mixed composition when discharged from the mixer as supplemented by the heat supplied to the rolls and the heat generated by internal friction during the sheeting operation serves to maintain the temperature of the composition so that it preferably does not fall below the mixing temperature and may be somewhat higher than the mixing temperature, as the sheeted composition is carried on the surface of the roll 22. Maintenance of such temperature conditions is highly important in order that the sheeted composition will firmly adhere to the roll 22 and will possess proper consistency for conversion into particles or granules by gouging them from the sheet while it is carried on the surface of the roll 22; and the fact that heat plasticized particles or granules can be successfully produced in the manner described if these requisite conditions are maintained is a significant feature of this invention. When the proper controls were not maintained the operation was inoperable due to such occurrences as the sheet becoming stripped wholly or in chunks from the roll 22 when attempt was made to gouge the particles or granules therefrom and there was resultant fouling and complete failure to obtain particles or granules in a usable condition. By way of a further more specific example when the mixing temperature is approximately 350° F. a temperature of about 350° F. or somewhat above for the roll 22 and the stock temperature of the sheet formed and carried thereby provides good operating conditions. However, the temperature control can be varied within the aforesaid temperature range of 300° F. to 375° F. depending principally on the particular composition formulation that is processed. More generally it is preferable to employ as high a temperature for the sheeting operation and for the gouging of particles from the sheet as is consistent with minimizing degradation of the vinyl resin component of the composition. This is opposed to conventional practice in the sheeting of such compositions wherein the temperatures employed are those at which the plastic material readily leaves the sheeting rolls rather than adhering firmly thereto. By utilizing inherent characteristics of the compositions whereby under the temperature control conditions maintained whereby the formed sheet remains firmly adherent to one of the sheeting rolls, the coaction between the sheet, the roll on which it is carried and the action of the gouging members is such that the particles or granules are effectively produced.

In producing the heat plasticized particles or granules by gouging them from the sheet which is formed between the rolls 21 and 22 while the sheet, under the temperature conditions above mentioned, is carried by the roll 22 in firmly adherent relation thereto, the gouging is performed using the gouging or scratcher roll 23 which is preferably housed in the enclosure 24 that is provided with a transparent or sliding door 25 through which the operations may be observed. As shown in Figs. 3, 4 and 5 the scratcher roll 23 consists of a roll having numerous spikes, teeth or gouging pins 26 projecting from and distributed in fixed position as on 1 inch centers over the surface thereof. The spikes or pins 26 are removable and may be variously spaced and inserted in staves 27 which fit into axially extending recesses 28 in the surface of the roll 23. The roll 23 is adjustably movable toward or away from the surface of the roll 22 and is set so that the pins 26 or other gouging members can gouge out particles of desired size of the plastic composition from the sheet 29 as it is carried in adherent relation on the surface of the roll 22. The roll 23 revolves on its axle 30 in a direction opposite to that of roll 22 as shown by the arrows in Fig. 3 so that the gouging members move in the same direction as the travel of the sheet 29 on the roll 22. The scratcher roll is separately driven by a variable speed motor (not shown) so as to maintain a surface speed differential between the roll 23 and the coacting sheeter roll 22 which can be varied at will. The scratcher roll is maintained at a higher peripheral speed than that of the roll 22 and the speed differential between these rolls preferably is at least about 25 or more to 1 so as to facilitate clean separation of the particles gouged from the sheet by the gouging members. Most of the sheet 29 is converted to the particles or granules by the action of the gouging members and any plastic material remaining adherent to the roll 22 will return to the nip between the rolls 21 and 22. In this manner the hot plastic composition can be successfully converted into discrete particles or granules under the controlled conditions hereinabove described. Since the composition is mixed and formed into a sheet which is carried on the roll 22 while maintaining the temperature controls aforesaid it is apparent that the particles or granules as initially produced are within the aforesaid temperature range, and preferably at a temperature which is not substantially below the mixing temperature.

The size of the granules produced by the scratcher roll depends largely on the thickness of the sheet produced between the rolls 21 and 22, the speed at which the scratcher roll is operated, the relative surface speeds of the scratcher roll and the coacting sheeter roll and the depth or penetration of the pins 26 or other gouging members into the body of the sheet 29. The pins 26 or other gouging members preferably are not pointed but are slightly tapered toward a flat outer tip. Moreover, they are preferably positioned so as not to extend diametrically outwardly but at an angle approximately 25° to the diameter of the roll 23 and downwardly on the upwardly moving side of this roll. The clearance between the tips of the pins 26 and the metal surface of the roll 22 preferably is not less than about .02 inch, and is less than about .25 inch Further features of this invention are concerned with the formation of the heat plasticized particles or granules in relation to subsequent calendering and to the relative conditions under which these operations are carried out. While the heat plasticized granules are preferably produced as above described and improved products are obtained when this is the case, the further features and advantages of this invention hereinafter described may also be realized if the heat plasticized particles or granules are produced in some other way.

In the manufacture of a plain or solid color sheet the particles or granules immediately on their production are collected, after falling in discrete condition through the atmosphere in the enclosure 24, on and adjacent the end of the heated conveyer 31, and they are continuously moved out of the enclosure 24 at a controlled rate by the conveyer 31 to the upper rolls 32 and 33 of a four roll calender. The provision of means for supplying the particles or granules at a controlled rate is an important factor in obtaining desirable and uniform products. It will be noted that the rolls 32 are on about the same level and rotate toward each other at their upper surfaces so as to receive the granules 41 (Fig. 1), the space above and between them serving as a hopper for the particles discharged from the conveyer 31 as the particles are formed into a continuous sheet between the rolls 32 and 33.

The entire length of the conveyer 31 is preferably heated to maintain the particles at a temperature which is approximately the same as that of the particles as initially formed. Thus if the particles are initially formed at a temperature of about 325° to 350° F. the particles are maintained on the conveyer at a temperature within this range. The conveyer may be heated electrically or by circulating hot gases through the ducts 32 and through a heat insulated enclosure 35. In Fig. 2 the advancing portion 36 and the return portion 37 of the conveyer 31 are shown supported on rollers 38 movable on upper and lower tracks 39 and 40 respectively.

In the case of the formation of a sheet of plain or solid color the stock temperature of the particles or granules during calendering between the rolls 32 and 33 may be substantially the same as the stock temperature during the mixing and particle formation steps and the temperature of the rolls 32 and 33 may be controlled so as to maintain such stock temperatures. As aforesaid, the stock temperatures may be within the aforesaid range of 300° to 375° F. and, more particularly, if the plastic composition is mixed at a temperature of about 325° to 350° F. the stock temperature during calendering can be maintained within this temperature range. It is usually preferable to maintain the temperature of the roll 33 at a slightly higher temperature than the roll 32 and the temperature of the rolls may be maintained at approximately stock temperatures or somewhat below when a sheet of plain or solid color is being produced.

By the foregoing steps a method of producing a sheet of solid or plain color is afforded which has several decided advantages. The steps of hot mixing, forming the mixed composition into a sheet, converting the sheet to heat plasticized particles and the formation of the heat plasticized particles into a second continuous sheet on a calender to which the particles are fed, serves excellently for providing a sheet which is of uniform consistency throughout due to the improved commingling of the composition ingredients which result from the initial sheet formation and the conversion of the sheet initially produced to particles which are indiscriminately commingled and then reworked in being formed into the second sheet. Moreover, the composition material as thus supplied to the calender can be maintained under conditions of extremely uniform temperature throughout so that more uniform calendering is afforded. Likewise the supply of the composition to the calender in the form of heat plasticized granules more readily aids in the release of entrapped air, and extraction of foreign metallic particles from the plastic particles, as by use of magnetic separators, is readily made possible thereby preventing damage to the calender rolls. The operation is also one wherein continuous operation is made possible in a continuous manner due to the fact that the plastic mass as initially produced in a hot plastic and workable condition can be converted into particles without loss of heat whereby the particles as produced in the hot plastic condition may be immediately calendered.

The operations hereinabove described may be most advantageously employed in the production of a sheet of variegated color. In such case the granules which are formed into a sheet between the rolls 32 and 33 instead of all being the same color will be a predetermined mixture of particles or granules having different color. Thus heat plasticized particles having one color may be produced using the sheeter rolls 21 and 22 and the scratcher roll 23 as hereinabove described and heat plasticized particles or granules of a different or contrasting color may be introduced continuously and in controlled amount into the enclosure 24 from a hopper 42. The particles are introduced into the enclosure 24 from the hopper 42 so as to fall in discrete condition through the air within the enclosure 24 and they become commingled with the particles produced by the action of the scratcher roll 23 as the latter particles likewise are falling through the air.

It is thus seen that the heat plasticized particles of different color are commingled while in essentially discrete condition in a gaseous atmosphere so that when the particles are collected on and are conveyed away by the conveyer 31 the particles of different color are uniformly distributed with each other as they are fed to the supply of particles 41 that is formed into a sheet by the rolls 32 and 33.

The particles in the hopper 42 are prepared in a manner similar to that employed in preparing the granules initially obtained in the enclosure 24. Ordinarily they are of essentially the same composition as the particles produced by the scratcher roll 23 except for difference in color, although this is not essential provided the particles of different color are compatible or miscible with each other. Depending upon the color combination desired in the final product, particles of desired color or colors are introduced into a hopper 43. The original materials are mixed in a heated mixer, and the mix formed in the mixer is converted into the particles fed into the hopper 43 in a manner essentially similar to that hereinabove described. Thus, the mix is deposited on the sheeter 44 which forms the mix into a sheet as hereinabove described in connection with the sheeter rolls 21 and 22; and a scratcher or gouging roll 45, which is similar in construction and operation to the scratcher roll 23, converts the resulting sheet into particles or granules which are deposited in the hopper 43. The conditions of temperature during the operations of mixing, sheeting and reduction to granular or particulate form are the same as those hereinabove described in connection with mixer 20, the sheeter rolls 21 and 22 and the scratcher roll 23.

The particles which are deposited in the hopper 43 are fed therefrom into a screw conveyer 46. The screw conveyer 46 deposits the particles on a heated conveyer 47 which is similar in construction and operation to the conveyer 31 and which is provided with an enclosure 48 having ducts 49 for heating gas, these parts being similar to the enclosure 35 and the ducts 34 respectively associated with the conveyer 31. The particles are deposited by the conveyer 47 in the hopper 42 from which they are fed into the enclosure 24 to be mixed with the granules provided by the scratcher roll 23 in the manner above described. The apparatus is continuously operative and provides granules at any rate needed into the enclosure 24 to provide a desired proprtion of particles which are of a contrasting or different color as compared with the particles produced by the scratcher roll 23. A supply of such particles of contrasting color may be kept on hand or such particles may be prepared continuously and supplied at the required rate by adjusting the speed of delivery of the screw conveyer 46. Preferably the conveyer 47 operates at a fixed speed so that all the granules are heated for the same length of time. By increasing or decreasing the amount of colored particles deposited by the conveyer 46 on the conveyer 47 the amount of particles of such color delivered to the main production line can be varied as desired.

While the mixture of particles of different color as fed to the nip between the rolls 32 and 33 may be at a temperature within the range hereinabove mentioned, it is preferable in the production of a sheet of variegated color that the granules as fed to the rolls 32 and 33 be at a somewhat lower temperature, namely, in the approximate range of 275° to 325° F. It is desirable that the particles of different color all be preheated to substantially the same temperature for being fed to the calendar rolls 32 and 33.

The temperature of the composition as it is calendered between the rolls 32 and 33 may be in the range above indicated for the production of a sheet of solid color. However, better color definition is afforded in the production of a sheet of variegated color when the composition during calendering is maintained at somewhat lower temperature, namely, in the approximate range of 250° F. to 325° F. Thus, the temperature of the composition is preferably from about 25° to about 75° below the mixing temperature of the composition and the temperature of the composition as it is initially converted into the form of particles or granules. Likewise for providing improved color definition it is desirable that the temperature of the calender rolls be maintained substantially below the temperature of the composition as it is formed into a sheet from the particles supplied to the calender rolls. For example, the calender roll 32 may be maintained at a temperature in the approximate range 175° to 190° F. while the calender roll 33 may be maintained at a temperature in the approximate range of 200° F. to 250° F. In such case the lower roll temperatures maintained will serve to cool the composition as it undergoes calendering so as to be substantially below the mixing temperature as above mentioned. Preferably the roll 33 is operated at a peripheral speed somewhat in excess of that of the roll 32, but this is not essential.

The calender rolls 32 and 33 of the four roll calender shown exercise the primary sheet forming and calendering functions. However the rolls 50 and 51 of the calender may also be employed so that the calender subjects the composition to three different calendering operations. In any case the effect of the calendering is to produce a sheet of variegated color in the form of streaks having a jaspe appearance. When the mixture of particles having different color is supplied to the rolls 32 and 33 by the conveyer 31, the action of the rolls 32 and 33 is to form the particles into a continuous sheet having a jaspe appearance wherein the streaks are relatively short. By also passing the sheet between rolls 33 and 50 the sheet is further solidified and the streaks formed by the rolls 32 and 33 are further elongated. This action is accomplished by a slight reduction in the thickness of the sheet and by maintaining a small differential between the surface speeds of the rolls 33 and 50. The sheet may be still further reduced in thickness by a pass between the rolls 50 and 51 which also have a surface speed differential thereby effecting further elongation of the streaks. For most purposes passage of the mixture of variegated color imparted by the particles solely between the rolls 32 and 33 produces a sheet of desirable color variegation in the form of jaspe streaks. In such case by adjustment of the position of the rolls 50 and 51 the calendering effect of one or both of the rolls 50 and 51 may be omitted. In Fig. 1 all four rolls of the calender are shown in operation. Alternatively it is possible to use the rolls 32 and 33 for calendering and the rolls 50 and 51 as cooling rolls. The use of the rolls 50 and 51 as cooling rolls is particularly suitable in those cases when it is desired to produce a finished sheet having either a solid or plain color or having variegated color of jaspe appearance.

The aforesaid temperatures and temperature differentials are illustrative of those appropriate in connection with a vinyl plastic composition of the typical formulation hereinabove described. For different compositions the temperature prevailing and maintained during the different steps may vary somewhat as compared with those hereinabove given depending primarily on such factors as the softening point of the vinyl resin used, the proportion and kind of filler, and the proportion and efficacy of the plasticizer, those combinations which acquire desired consistency at a higher temperature being processed at correspondingly higher temperatures than those applicable in the case of compositions which acquire the same consistency at a somewhat lower temperature. However, in such case the temperature differentials maintained would remain substantially as hereinabove stated.

While certain temperature ranges have been indicated as occurring in the different operations and steps involved; the temperature that occurs in each of these operations or steps is normally held as rigidly constant as possible in any given production run and roll temperatures are maintained uniform throughout the length of the roll so that uniformity of the finished product will be maintained. Such uniformity is readily accomplished in the practice of this invention as well as exact duplication of results for different production runs. It is important in this trade that a pattern of a given sample be capable of reproduction and substantial duplication, this being a matter that has occasioned particular difficulty in the past. However, the practice of this invention affords a high degree of flexibility in that by varying the conditions that are maintained, even relatively slightly, different color, pattern, and other effects are obtainable. The principal factors as regards pattern effects of variegated color are the temperatures and temperature differentials maintained, the spacings between opposing calender rolls, and the size of the bank maintained at the nip between opposing calender rolls.

Products are obtainable at various stages in the above process which are adapted to find many uses. The process yields pigmented plastic granules or pellets of convenient sizes for handling in molding processes; and plain colored sheets and sheets of variegated color such as jaspe and marbleized are afforded in various thicknesses for various decorative purposes.

The invention hereinabove set forth is embodied and utilized in particular form and manner but may be variously embodied and utilized within the scope of the claims hereinafter made.

I claim:

1. In a process of preparing a vinyl plastic product, the steps comprising forming a heat plasticized vinyl plastic composition into a sheet, making said sheet while at a temperature between about 300° F. to about 375° F. firmly adherent to the surface of a heated rotating roll by sheeting said composition at the nip between said roll and an adjacent roll, and while said sheet is so adherent to the surface of said roll and is at said temperature converting said sheet into heated plasticized particles by gouging said particles therefrom by the action of a multiplicity of gouging members which substantially penetrate said sheet and are removed relative thereto while rotating about an axis parallel to that of said roll at a peripheral speed at least twenty-five times the peripheral speed of said composition on said adjacent rotating roll and in the same direction as the composition on said adjacent rotating roll when said composition is in contact with said gouging members, any of said sheet not converted into said particles being carried on the surface of said roll back to said nip.

2. A method of making a vinyl plastic product which comprises mixing plasticizer, vinyl resin and filler by mechanical mixing action while said materials are heated to a temperature at which the mixed materials are workable to effect substantially uniform commingling of said materials by said mixing, and while the resulting mixture is maintained at a temperature not substantially below the mixing temperature performing the further steps of forming the mixture into a continuous sheet, pressing said sheet to firmly adhere to and to be carried by the surface of a rotating roll heated to maintain said sheet at substantially the mixing temperature, and while the sheet is so adhered to and carried by the surface of said rotating roll continuously converting it into moldable heat plasticized particles by gouging said particles therefrom.

3. A method of making a vinyl plastic sheet which comprises the steps of continuously forming into a sheet a vinyl plastic composition heated to a temperature at which it is of moldable and workable consistency within the range of about 300° F. to about 375° F., adhering the resultant heated sheet to the surface of a heated rotating roll on which it is continuously carried through a substantial distance, continuously converting the heated sheet while maintaining it within the said temperature range into moldable heat plasticized particles by gouging said particles therefrom while said sheet is adherently carried on the surface of said heated rotating roll, collecting said moldable heat plasticized particles so-produced, and while maintaining their said moldable heat plasticized consistency continuously feeding them at a substantially constant rate to calender rolls and forming them into a continuous sheet by said calender rolls.

4. A method of producing a vinyl plastic sheet having a wear surface of variegated color which comprises mixing plasticizer, vinyl resin and filler by mechanical mixing action while said materials are heated to a temperature at which the mixed materials are workable to effect substantially homogeneous commingling of said materials by said mixing, and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll continuously converting it into moldable heat plasticized particles by gouging said particles therefrom, commingling said particles while still retaining their heat with similar particles having a different color to form a heated mixture of variegated color imparted by said particles and calendering the heated mixture while at a temperature of about 25° F. to about 75° F. below said mixing temperature between rolls to form a calendered sheet of variegated color, the roll during said calendering contacting the wear surface of the sheet being maintained at a higher temperature than the roll contacting the opposite side of the sheet.

5. A method according to claim 4 wherein during said calendering the calender roll surface in contact with the back surface of the resulting calendered sheet is maintained at a temperature between about 175° F. and about 190° F. and wherein the calender roll surface in contact with the wear surface of said sheet is maintained at a substantially higher temperature within the range of about 200° F. to about 250° F.

6. A method of making moldable heat plasticized particles which comprises mixing pigment, plasticizer, vinyl resin and about 50 to about 75 percent of filler while said materials are workable to effect substantially homogeneous commingling of said material by said mixing and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll, continuously converting it into moldable heat plasticized particles by gouging said particles therefrom.

7. A method of making moldable heat plasticized particles which comprises mixing pigment, plasticizer, vinyl resin and about 50 to about 75 percent of filler at a temperature between about 300° F. and about 375° F. to effect substantially homogeneous commingling of said material by said mixing and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll, continuously converting it into moldable heat plasticized particles by gouging said particles therefrom.

8. A method of making moldable heat plasticized particles which comprises mixing pigment, plasticizer, filler and a polyvinyl chloride resin while said materials are workable to effect substantially homogeneous commingling of said material by said mixing and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll, continuously converting it into moldable heat plasticized particles by gouging said particles therefrom.

9. A method of making moldable heat plasticized particles which comprises mixing pigment, plasticizer, filler and a polyvinyl chloride resin at a temperature between about 300° F. and about 375° F. to effect substantially homogeneous commingling of said material by said mixing and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll, continuously converting it into moldable heat plasticized particles by gouging said particles therefrom.

10. A method of making moldable heat plasticized particles which comprises mixing pigment, plasticizer, polyvinyl chloride resin and about 50 to about 75 percent of filler at a temperature between about 300° F. and about 375° F. to effect substantially homogeneous commingling of said material by said mixing and while the resulting mixture is maintained at a temperature not substantially below the mixing temperature performing the further steps of forming the mixture into a continuous sheet, pressing said sheet to firmly adhere to and be carried by the surface of a rotating roll heated to maintain said sheet at substantially the mixing temperature, and while the sheet is so adhered to and carried by the surface of said rotating roll, continuously converting it into moldable heat plasticized particles by gouging said particles therefrom.

11. The process of claim 10 wherein the gouging is effected by the action of a multiplicity of gouging members which substantially penetrate the sheet firmly adhering on the rotating roll and are removed relative thereto while rotating about an axis parallel to that of the sheet carrying roll at a peripheral speed at least twenty-five times the peripheral speed of the sheet on the adjacent rotating roll and in the same direction as the sheet on said adjacent rotating roll when said sheet is in contact with said gouging members.

12. A method according to claim 2 wherein said mixing temperature is between about 300° F. and 375° F., said continuous sheet is formed by passing the composition between the nip formed by said rotating roll and a second roll and said gouging is effected by the action of a multiplicity of gouging members which substantially penetrate the sheet firmly adhering on the rotating roll and are removed relative thereto while rotating about an axis parallel to that of the sheet carrying roll at a peripheral speed at least twenty-five times the peripheral speed of the composition of the adjacent rotating sheet carrying roll and in the same direction as the composition on said adjacent rotating roll when said composition is in contact with said gouging members, any of said sheet not converted into said particles being carried on the surface of said rotating roll back to said nip.

References Cited in the file of this patent
UNITED STATES PATENTS

| | | |
|---|---|---|
| Re. 16,384 | McCrohan | July 13, 1926 |
| Re. 21,390 | Grote | Mar. 12, 1940 |
| 653,312 | Pond | July 10, 1900 |
| 690,238 | Crean | Dec. 31, 1901 |
| 1,763,314 | McConoughey | June 10, 1930 |
| 1,939,045 | Fredriksen | Dec. 12, 1933 |
| 1,975,515 | Mayer | Oct. 2, 1934 |
| 2,290,241 | Kasen | July 12, 1942 |
| 2,331,275 | Perry | Oct. 5, 1943 |
| 2,341,651 | Raschig | Feb. 15, 1944 |
| 2,451,597 | Wheeler | Oct. 19, 1948 |
| 2,512,523 | Fisher et al. | June 20, 1950 |
| 2,548,909 | Ryden | Apr. 17, 1951 |
| 2,551,005 | Johnson | May 1, 1951 |
| 2,608,717 | Kay | Sept. 2, 1952 |
| 2,624,514 | Wilhousky | Jan. 6, 1953 |
| 2,625,712 | Eaby | Jan. 20, 1953 |
| 2,689,981 | McCarthy | Sept. 28, 1954 |
| 2,740,991 | Hess et al. | Apr. 10, 1956 |